United States Patent
Livet et al.

(10) Patent No.: US 8,903,177 B2
(45) Date of Patent: Dec. 2, 2014

(54) METHOD, COMPUTER PROGRAM AND DEVICE FOR HYBRID TRACKING OF REAL-TIME REPRESENTATIONS OF OBJECTS IN A SEQUENCE

(75) Inventors: Nicolas Livet, Saint Egreve (FR); Thomas Pasquier, Libourne (FR); Jérémy Chamoux, Naves Parmelan (FR)

(73) Assignee: Total Immersion, Suresnes (FR)

( * ) Notice: Subject to any disclaimer, the term of this patent is extended or adjusted under 35 U.S.C. 154(b) by 181 days.

(21) Appl. No.: 13/502,619

(22) PCT Filed: Oct. 12, 2010

(86) PCT No.: PCT/FR2010/052154
§ 371 (c)(1),
(2), (4) Date: Apr. 18, 2012

(87) PCT Pub. No.: WO2011/048302
PCT Pub. Date: Apr. 28, 2011

(65) Prior Publication Data
US 2012/0201469 A1 Aug. 9, 2012

(30) Foreign Application Priority Data
Oct. 20, 2009 (FR) ...................... 09 57353

(51) Int. Cl.
*G06K 9/00* (2006.01)
*G06K 9/46* (2006.01)
*G06T 7/20* (2006.01)
*G06K 9/62* (2006.01)

(52) U.S. Cl.
CPC ............ *G06K 9/6202* (2013.01); *G06T 7/2033* (2013.01); *G06T 2207/10016* (2013.01)
USPC ............................. 382/201; 382/103; 348/169

(58) Field of Classification Search
CPC ......... G06K 9/18; G06K 9/46; G06K 9/4604; G06K 9/28; G06K 9/32; G06T 7/0044; G06T 7/2033; G06T 2207/10016
USPC ......... 382/195, 201, 154, 103, 209, 118, 215; 348/169, 208.14; 340/5.1
See application file for complete search history.

(56) References Cited

U.S. PATENT DOCUMENTS 5,828,769 A * 10/1998 Burns ........................... 382/118
6,526,156 B1 * 2/2003 Black et al. .................... 382/103
(Continued)

FOREIGN PATENT DOCUMENTS

EP 1594322 A2 11/2005

OTHER PUBLICATIONS

Park, Youngmin et al., "Multiple 3D Object tracking for Augmented Reality", IEEE International Symposium on Mixed and Augmented Reality, Cambridge, UK, 2008, pp. 117-120.

(Continued)

*Primary Examiner* — Sheela Chawan
(74) *Attorney, Agent, or Firm* — Browdy and Neimark, PLLC (57) ABSTRACT

The invention in particular relates to the hybrid tracking of representations of objects in a sequence of images using at least one key image. After acquiring a first and second images including a representation of the tracked object, a first image portion is identified in the first image, and a second image portion is retrieved from the key image. A relative pose of a first image portion of said second image, similar to the first image portion of the first image, is estimated. A second image portion of the first or second image, similar to the second image portion of the key image, is sought. The relative pose of the object is then estimated according to the relative poses of the first image portions and the second image portions.

13 Claims, 8 Drawing Sheets

(56) References Cited

U.S. PATENT DOCUMENTS 7,064,776 B2 * 6/2006 Sumi et al. .................... 348/169
7,831,087 B2 * 11/2010 Harville ........................ 382/154

OTHER PUBLICATIONS

Vachetti, Luca et al., "Fusing Online and Offline Information for Stable 3D Tracking in Real-Time", Proceedings of the 2003 IEEE Computer Society Conference on Computer Vision and Pattern Recognition, 2003, pp. 1-8.

Ta, Dan-Nguyen et al., "SURFTrac: Efficient Tracking and Continuous Object Recognition using Local Feature Descriptors", IEEE, 2009, pp. 2937-2944.

Gao, Jiang, "Hybrid Tracking and Visual Search", Nokia Corporation, San Francisco, California, pp. 909-912.

Wagner, Daniel et al., "Pose Tracking from Natural Features on Mobile Phones", IEEE International Symposium on Mixed and Augmented Reality, Cambridge, UK, 2008, pp. 125-134.

Murphy-Chutorion, Erik et al., "Head Pose Estimation in Computer Vision: A Survey", IEEE Transactions on Pattern Analysis and Machine Intelligence, vol. 31, No. 4, Apr. 2009, pp. 607-626.

Hinterstoisser, Stefan et al., "Online Learning of Patch Perspective Rectification for Efficient Object Detection", IEEE, 2008.

* cited by examiner

METHOD, COMPUTER PROGRAM AND DEVICE FOR HYBRID TRACKING OF REAL-TIME REPRESENTATIONS OF OBJECTS IN A SEQUENCE

The present invention concerns image analysis and more particularly a method, a computer program and a device for hybrid tracking of real-time representations of objects in a sequence of images, in particular for augmented reality applications.

The purpose of augmented reality is to insert one or more virtual objects into images of a video stream. Depending on the type of application, the position and orientation of these virtual objects can be determined by data external to the scene represented by the images, for example coordinates taken directly from a game scenario, or by data associated with certain elements of this scene, for example coordinates of a particular point in the scene such as the hand of a player or an element of the setting. When the position and the orientation are determined by data associated with certain elements of the scene, it may be necessary to track such elements with respect to movements of the camera or movements of these elements themselves in the scene.

Object recognition algorithms (or object indexation algorithms) make it possible to identify the presence of the representation of certain objects in an image or a sequence of images taken from an image sensor such as a camera. Also, these algorithms are often able to determine the approximate position of the object recognised with respect to the reference position of the camera.

By way of illustration, the Lausanne Federal Polytechnic school has developed such an algorithm. During an initialization phase, characteristic elements of different representations of objects, known as descriptors, for example sets comprising points of interest and their neighbourhood forming an image portion, are stored and organised according to classification structures such as binary decision trees or according to multi-branch structures, also known as FERNS type decision structures. During a recognition phase, these structures provide for a simple and rapid classification of objects represented in images by comparing the intensity of pixels (acronym for Picture Element) of image portions retrieved around points of interest previously detected in the image.

Points of interest, representing locations with high values of directional gradients in the image, are, for example, of the Harris, FAST, SURF (acronym for Speeded-Up Robust Features), SIFT (acronym for Scale-Invariant Feature Transform), MSER (acronym for Maximally Stable Extremal Region) or YAPE (acronym for Yet Another Point Extractor) types.

The matching carried out between the image portions retrieved, according to the points of interest identified, from the image analysed and the image used during initialization, based on the decision structure previously created, makes it possible to identify correspondences with objects present in the database. These correspondences can be used to decide the identity of one or more objects represented in the image analysed and to retrieve an approximate pose.

The tracking algorithms can themselves be used to find very precisely in a real scene the pose, i.e. the position and orientation, of an object the geometry information of which is generally available or, in an equivalent way, to find the extrinsic position and orientation parameters for a camera filming the object thanks, for example, to image analysis.

By way of illustration, there is a visual tracking algorithm based on the matching of points of interest of the current image in a video stream with those of a key image, called a keyframe, obtained upon initialization of the system, or those of a key image updated during the execution of the visual tracking. These key images characterise the objects recorded in the system. The algorithm can then be used to find, in a real scene, the pose of an object for which the three-dimensional (3D) mesh is available in the form of a 3D model, or to find, in an equivalent way, the extrinsic position and orientation parameters for a camera filming the object.

The current image is first processed with an operator in order to detect points of interest. Image portions retrieved around these points of interest are then compared with image portions retrieved around points of interest previously detected in one or more key images recorded in order to find a large number of correspondences, or matches, between these pairs of images in order to estimate the pose of the object. For this purpose, a key image is here made up of three elements: an image captured from the video stream, a pose (orientation and position) of the real object appearing in this image and the intrinsic parameters characterising the camera used to capture the image. The key images are images retrieved from the video stream in which the object to be tracked has been placed manually thanks to the use of a pointing device such as a mouse. The key images preferably characterise the pose of the same object in several images. They are created and recorded "offline", i.e. outside the permanent tracking application mode. It is interesting to note that, for targets or objects of the planar type, for example a magazine, these key images can be directly generated from an available image of the object, for example in JPEG or bitmap format.

During initialization of the tracking application, the offline key images are processed in order to position points of interest depending on the parameters selected when launching the application. These parameters are specified empirically for each type of usage of the application and can be used to adapt the detection and matching application in order to obtain a better quality of estimation of the pose of the object according to the characteristics of the real environment. Next, when a representation of the real object in the current image is in a pose which is close to the pose of a representation of the same object in one of the offline key images, the number of matches becomes large. It is then possible to find the affine transformation making it possible to overlay the three-dimensional model of the object on the real object.

When such correspondence has been established, the tracking algorithm switches to permanent mode. The movements of the object are tracked from one image to the other and any drifts are compensated thanks to the information contained in the offline key image selected during initialization. It should be noted that, for the sake of accuracy, this offline key image can be re-projected using the estimated pose of the preceding image. This re-projection thus makes it possible to have a key image containing a representation of the object similar to that of the current image and can thus enable the algorithm to operate with points of interest and descriptors which are not robust to rotations.

Generally, a point p of the image is the projection of a point P of the real scene with $p \sim P_I \cdot P_E \cdot T_{p \to c} \cdot P$ where $P_I$ is the matrix of the intrinsic parameters of the camera, i.e. its focal length, the centre of the image and the offset, $P_E$ is the matrix of the extrinsic parameters of the camera, i.e. the position of the camera in real space, and $T_{p \to c}$ is the matrix of passage between the reference point associated with the tracked object and the reference point attached to the camera. Only the relative position of the object with respect to the relative position of the camera is considered here, which means positioning the reference point of the real scene at the optical centre of the camera. This results in the relationship $p \sim P_I \cdot P_E \cdot T_{p \to c} \cdot P$. Since matrix $P_I$ is known, the tracking problem thus consists in determining matrix $T_{p \to c}$ i.e. the position and orientation of the object with respect to the reference point of the camera.

To do this, an algorithm known as "error minimization" is used to find the best solution for estimating $T_{p \to c}$ using all of the three-dimensional correspondences on the geometric model and two-dimensional (2D) correspondences in the current image and in the key image. By way of example, an algorithm of the RANSAC (acronym for RANdom SAmple Consensus) or PROSAC (acronym for PROgressive SAmple Consensus) type, making it possible to suppress measurement errors (erroneous 2D/3D correspondences), can be combined with an algorithm of the Levenberg-Marquardt type to converge rapidly towards an optimum solution, reducing the re-projection error.

However, when the measurement error becomes too great, i.e. when the number of matches between the current image and the current key image becomes too small, tracking undergoes uncoupling (it is considered that the estimation of the pose of the object is no longer sufficiently coherent) and a new initialization phase is necessary.

There is also an object tracking algorithm called "KLT feature Tracker", making it possible to track characteristic points in a sequence of images and to estimate a temporal optical flow (called optical flow), i.e. the movements of pixels between two consecutive images. This method is thus intended to find a pixel v in an image J which seems most similar to a pixel u of an image I by estimating the movement d of this pixel between the two images. In other words, the coordinates of the pixel v can be expressed as follows: v=u+d=[ux+dx, uy+dy].

An implementation of the search for and tracking of these descriptors is proposed in the public domain and is known under the name OpenCV (acronym for Open Computer Vision), developed by the Intel company. This implementation proposes in particular the use of a pyramid of sub-sampled and smoothed images in order to increase the robustness of the solution to rapid movements of the tracked objects in the image or to rapid movements of the camera.

More precisely, the solution consists here in finding the position of an image portion $p_1$ of image I by seeking image portion $p_2$ of image J which is most similar. When a first satisfactory result is found for this resolution, an iteration is carried out on the pyramid structure where a new estimation of the movement is made. The process is repeated until the initial image (for example that acquired by the image sensor) is resolved.

However, the use of these recognition and tracking algorithms is particularly costly in terms of calculations and adversely affects the performance of systems without powerful processors, such as, for example, lightweight platforms such as mobile telephones. Furthermore, these algorithms are generally insufficiently robust to noise, to rapid movement and to changes in brightness. They are therefore not suitable to be implemented in a device such as a mobile telephone with a low-power processor and an image sensor of poor quality.

The invention makes it possible to resolve at least one of the problems set out above.

An object of the invention is therefore a computer method of hybrid tracking a representation of at least one object in a sequence of images using at least one key images, the method comprising the following steps:

acquisition of a first and second image of said sequence of images including a representation of said at least one object;

identification of at least one first image portion of said first image, said at least one first image portion of said first image including at least one part of a representation of said at least one object;

retrieval of at least one second image portion from said at least one key image, said at least one second image portion of said key image including at least one part of a representation of said at least one object;

estimation of a relative pose of at least one first image portion of said second image, similar to said at least one first image portion of said first image, according to said at least one first image portion of said first image;

search for at least one second image portion of said first or second image, similar to said at least one second image portion of said key image, and estimation of a relative pose of said at least one object according to the relative poses of said first image portions and said second image portions.

The method according to the invention thus makes it possible to track the representation of an object in a sequence of images according to a key image and a preceding image without requiring large calculation resources. The method can thus be implemented on a lightweight platform such as a mobile telephone.

According to a particular embodiment, said step of identifying said at least one first image portion of said first image includes a step of retrieving said at least one first image portion of said first image and said step of estimating said relative pose of said at least one first image portion of said second image includes a step of searching, in said second image, for said at least one first image portion of said second image, similar to said at least one first image portion of said first image.

The method according to the invention thus makes it possible to track the representation of an object in a sequence of images according to a key image and a preceding image by image analysis.

Advantageously, said step of searching for said at least one first image portion of said second image similar to said at least one first image portion of said first image implements a search algorithm of the KLT type. The search for similarity of image portions therefore does not require a costly re-projection step.

Said at least one second image portion is preferably retrieved from said at least one key image according to at least one point of interest of said key image determined previously. The method thus makes it possible to use singular points to optimise the object tracking quality.

Advantageously, the method also includes a step to select said at least one point of interest in order to choose relevant points of interest in terms of the amount of calculation needed. Advantageously, the method also includes a step of validating said at least one selected point of interest in order to choose relevant points of interest in terms of quality of result.

According to a particular embodiment, said step of searching for at least one second image portion of said first or second image, similar to said at least one second image portion of said key image, implements an algorithm of the KLT type making it possible effectively to obtain results of good quality.

Still according to a particular embodiment, said step of searching for at least one second image portion of said first or second image, similar to said at least one second image portion of said key image, includes a step of re-projecting said at least one second image portion of said key image according to an estimated pose of said at least one object in order to improve the quality of the results obtained.

Still according to a particular embodiment, the method also includes a step of determining at least one point of interest in said at least one second image.

Still according to a particular embodiment, said step of searching for said at least one first image portion of said second image, similar to said at least one first image portion of said first image implements at least two different algorithms to search for image portions by similarity. Such an embodiment makes it possible to make the tracking method more robust.

Still according to a particular embodiment, said step of estimating a relative pose of at least one first image portion of said second image and/or said step of searching for at least one second image portion of said first or second image includes a step of pose prediction using at least one result of the relative pose estimation of said at least one object carried out on preceding images. The method according to the invention thus makes it possible to combine image analysis and predictive calculation in order to optimise the results in terms of quality and amount of calculation needed.

An object of the invention is also a computer program including instructions suitable for implementing each of the steps of the method described above when said program is executed on a computer.

An object of the invention is also a device including means suitable for implementing each of the steps of the method described above.

The advantages gained by this computer program and this device are similar to those mentioned above.

Other advantages, aims and features of the present invention will become apparent from the detailed description below, given by way of non-limitative example, with reference to the attached figures, in which:

FIG. 3, comprising

Figure 1:
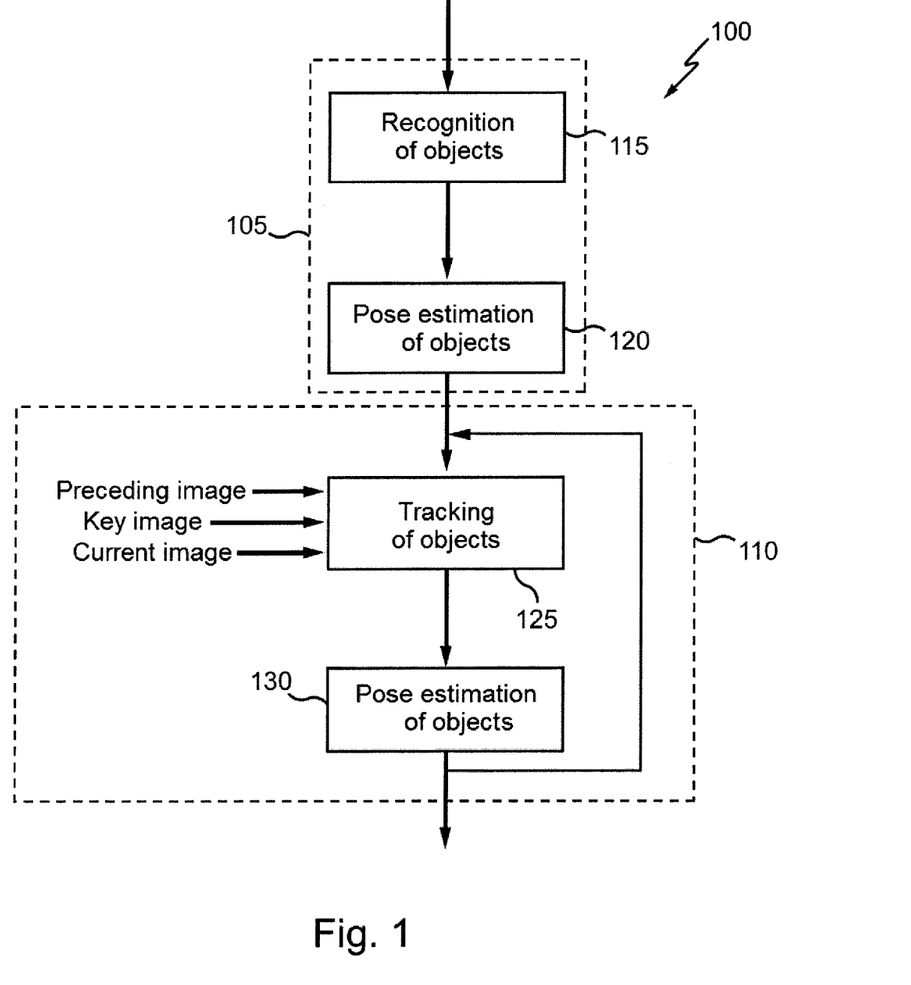
FIG. 1 illustrates certain steps of an example of a hybrid algorithm for tracking the representation of objects in a sequence of images according to the invention.

FIG. 1 illustrates certain steps in an example of a hybrid algorithm 100 for tracking the representation of objects in a sequence of images according to the invention. It includes an initialization phase 105 and a steady state 110.

The object of the initialization phase 105 is in particular to recognise one or more representations of objects in an image (step 115) and to evaluate the pose of these objects (step 120). The initialization phase is described in more detail with reference to FIG. 2.

During the steady state 110, the objects whose representation has been identified during initialization are tracked in the sequence of images (step 125) in order to estimate the pose of these objects (step 130). The steady state is described in more detail with reference to FIGS. 3a, 7 and 9. It is observed here that, when the tracked object is lost during the steady state, i.e. when the system undergoes uncoupling, a new initialization phase is preferably carried out.

Figure 2:
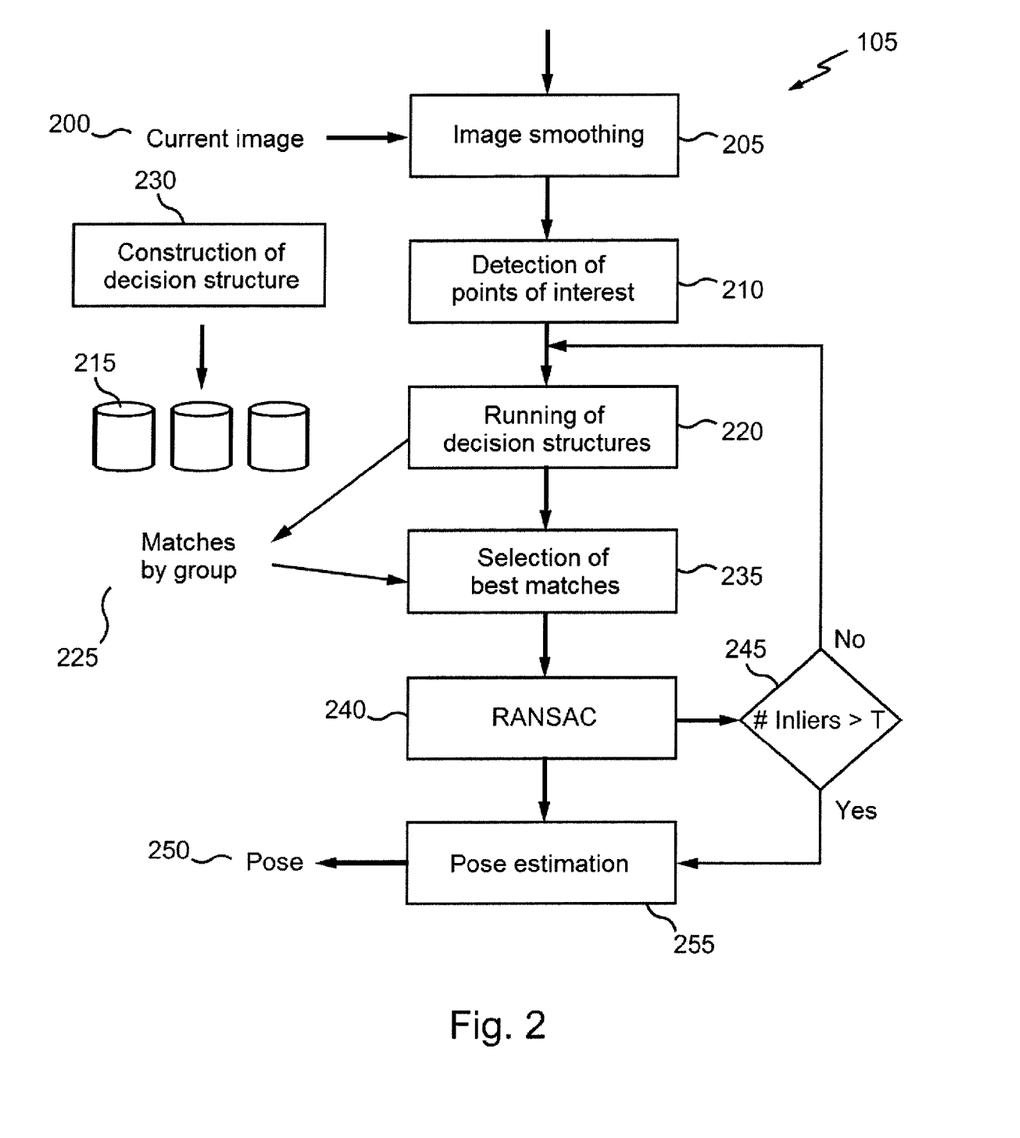
FIG. 2 illustrates an example of implementation of the initialization phase of the hybrid algorithm for tracking the representation of objects in a sequence of images represented in FIG. 1.

FIG. 2 illustrates an example of implementation of the initialization phase (105) of the hybrid algorithm 100 for tracking the representation of objects in a sequence of images represented in FIG. 1.

As indicated above, the initialization phase makes it possible to identify one or more objects located in the field of vision of an image sensor (for example, a camera) representations of which are visible in the images taken from this sensor and, secondly, to provide a pose for each of the objects identified, as precise as possible.

According to a particular embodiment, the identification of objects and estimation of their poses are based on the determination of points of interest and the use of decision structures. The principle then consists of applying an operator making it possible to detect points of interest such as points of the FAST, YAPE, HARRIS or MSER type in a given image taken from the image sensor. The image portions situated around points of interest identified are compared with image portions stored in the binary decision structures used in order to obtain a probability list which aims to indicate the similarity of these points with points of the objects (also called "classes") already classified in these structures and which form the knowledge database. In order to obtain robust results and limit the calculation resources needed, FERNS type decision structures are advantageously used.

The current image 200 used for the initialization phase is here acquired from the image sensor. It is preferably smoothed (step 205), for example using a Gaussian 3×3 filter, in order to reduce the presence of noise (this may disrupt the statistical results obtained during the running of the binary decision structure).

In order to facilitate the implementation of this filter on a lightweight platform such as a mobile telephone, it is optimised. Such optimization consists, in particular, in using a symmetrical filter ables to be represented in the form of a power of two so that the filtering is carried out by offsetting the coding of the pixel values.

The object of a subsequent step is to detect points of interest in the current smoothed image (step 210). According to a preferred embodiment, the points of interest detected are of the FAST type.

It should be recalled here that points of interest of the FAST type are determined by creating a Bresenham's circle with a predetermined perimeter, for example 16 pixels, around each pixel of the image. Each of these points is considered as being a point of interest if the number of pixels adjacent to this circle all with an intensity greater or smaller than that of the central pixel is greater than a predetermined threshold (for example, 9, 10, 11 or 12). Also, a post-processing step is generally applied so as only to select the most relevant points of interest in a given vicinity.

After detecting the points of interest of the current image, the decision structures 215 used are run (step 220) in order to determine the best correspondences 225 between the image portions of the current image situated around these points of interest detected and the image portions associated with points of interest previously stored in these structures. It is observed here that, during the creation of the decision structures (step 230), which is carried out in the standard way, several objects may possibly have been grouped together in the same set of structures. The grouping of several objects in the same group is intended to optimise the matching method while limiting the number of matching and identification error estimation steps for each of the objects. Consequently, a single sub-set of available objects is run during step 220 and only the correspondences with the most frequently matched object are retained.

The best matches are then selected (step 235). For this purpose, the object belonging to the group previously selected which presents the greatest number of matches with the highest probability values is selected.

A RANSAC type algorithm is then used on the matches previously selected (step 240) to re-project points of interest of the model of the object identified in order to estimate an object identification error. Thus, if there are insufficient points of interest correctly matched, i.e. if the error between the points of interest detected, in a sufficient number, and their re-projections on the basis of the model of the object (called inliers) is greater than a given threshold T (step 245), no object in the current group has been correctly identified. In this case, the preceding steps are repeated (steps 220 to 240) for the next group of objects. In the context of a low-power platform, it is advantageous to use groups containing the greatest possible number of objects. It should however be noted that two objects presenting similar texturation should ideally be separated in order not to spoil the robustness of the recognition method.

If, on the other hand, there are sufficient correctly matched points, a precise pose 250 of the object identified is estimated (step 255), for example by using an algorithm such as the Levenberg-Marquardt algorithm.

The solution described with reference to FIG. 2, based here on the implementation of multi-branch structures, presents numerous advantages, including the robust matching of points of interest detected in the current image, limited processing time to identify an object and estimate its pose and the ability to group objects together under the same group of structures (important when the number of objects to be recognised is high).

The construction of the multi-branch structure is preferably optimised to make it possible to limit the amount of memory occupied by each of the objects (it is necessary to use about 100 points properly to represent an object in the structure, these 100 points typically occupying about 1 Mb).

When one or more objects have been identified in the current image and their estimated poses are coherent, i.e. a sufficient number of matches has a low re-projection error, it is possible to use the matches and these poses to initiate the object tracking method.

According to a first embodiment, the tracking method uses recursive information from the preceding images and information from one or more key images corresponding to the tracked object. It is recalled here that a key image may be considered to be a two-dimensional representation of an object associated with the three-dimensional pose of the object. Several key images can be used to represent an object from several viewpoints. The selection of a key image from several is based on the similarity of the representation of the tracked objects and/or on the estimated pose of these objects.

Figure 3A:
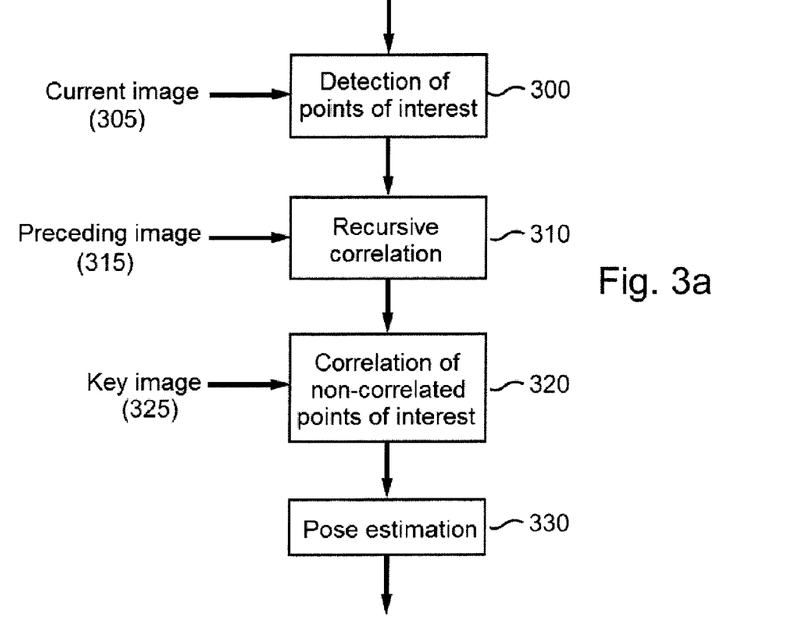
FIGS. 3a and 3b, illustrates a first implementation of the steady state of the hybrid algorithm for tracking the representation of objects in a sequence of images represented in FIG. 1.
Figure 3B:
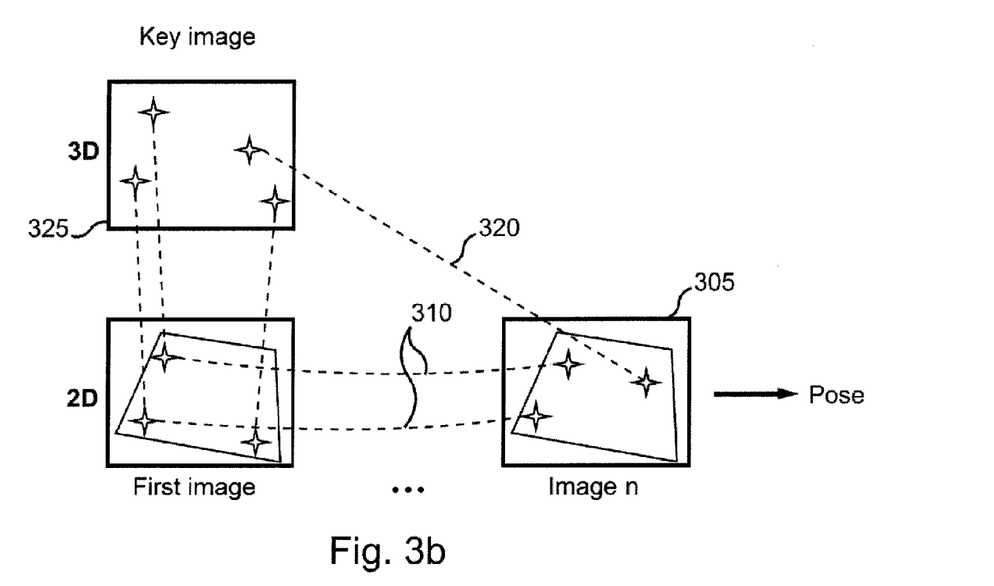

FIG. 3, comprising FIGS. 3a and 3b, illustrates this first embodiment. FIG. 3a represents certain steps of the tracking algorithm while FIG. 3b illustrates the implementation of the algorithm.

A first step (step 300) consists in detecting points of interest in a current image 305. Although several types of points of interest can be used, the points of interest used here are of the FAST type. They can thus be determined on a lightweight platform such as a mobile telephone.

The image portions situated around the points of interest detected are then compared with those retrieved around the points of interest of the preceding image 315 (these points of interest having been determined during processing of the preceding image or during initialization) in order to establish the correlation between the preceding image and the current image, i.e. to establish a list of correspondences between points of interest of the preceding image and the current image (step 310). This correlation may in particular be carried out using an operator for comparing the intensity of image portions of the ZNCC (acronym for Zero-mean Normal Cross Correlation) type. Each of the points thus matched has a correspondent in the key image (stored recursively), this correspondent being advantageously deactivated for the remaining steps of the method.

Points of interest of the current image that do not matched with points of interest of the preceding image are then used to establish a correlation between the current image and the key image 325 used (this may in particular be determined according to the pose of the object estimated on the basis of the preceding image). For this purpose, the image portions around the active points of interest of the key image (i.e. with no correspondent in the preceding image) are re-projected according to the pose estimated on the basis of the preceding image and then compared to those associated with the points of interest of the current image that do not matched with points of interest of the preceding image (step 320). Again, this correlation can in particular be carried out using an operator for comparing the intensity of image portions of the ZNCC type between the points re-projected on the current image and the adjacent points of the current image.

The pose of the object is then estimated (step 330) using the correspondences established between the points of interest of the current image with the points of interest of the preceding image and the key image.

The correlation errors are preferably suppressed by using the estimated pose of the object by comparing the positions of the points detected and matched in the current image with the theoretical positions obtained by re-projecting the corresponding 3D coordinates of the key image with a predetermined threshold. Thus, only the valid points of interest of the current image are used to process the next image.

Carrying out recursive matches with the preceding image before those carried out with the points of interest of the key image used makes it possible to avoid re-projecting a large part of the key image. Each recursive match in effect has a reference on the key image and the points of the key image already matched are not processed for the current image. This provides a significant saving in processing time, since image re-projection and matching operations are particularly onerous in terms of calculation.

It is observed here that, if the relative pose of an image portion of the current image similar to an image portion of the preceding image can be estimated by image analysis as described above, it can also be estimated by prediction on the basis of the changes in the pose of a similar image portion observed in a set of preceding images.

While this first embodiment makes it possible to perform very rapid processing, the pose estimated is not perfect. In order to improve it, it is possible to add a step to track points of interest using an algorithm of the KLT type (preferably modified to limit the requirements in terms of calculating power).

Figure 4:
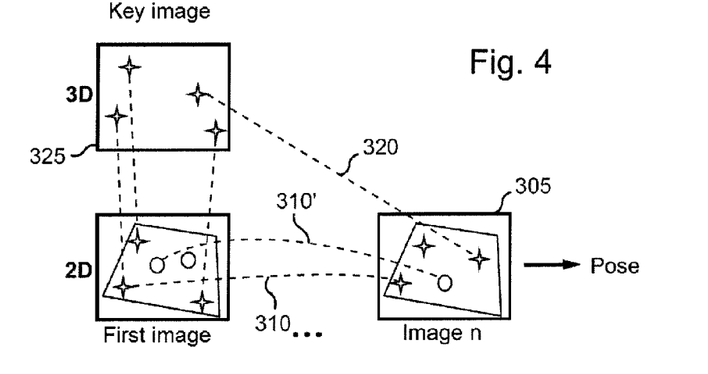
FIG. 4 diagrammatically illustrates a second implementation of the steady state of the hybrid algorithm for tracking the representation of objects in a sequence of images represented in FIG. 1.

Thus, according to this second embodiment, a step (step 310') to track points of interest is added after the recursive correlation step (step 310). Its purpose is to determine the movement of the points of interest of the preceding image that do not match with the points of interest of the current image, in the current image.

Only the points of interest of the key image not matched in the current image according to recursive correlation (step 310) and tracking of points of interest (step 310') are then re-projected to determine the correlation between the current image and the key image (step 230).

Estimation of the pose of the object is carried out similarly to that described with reference to FIG. 3.

FIG. 4 diagrammatically illustrates the implementation of this tracking algorithm.

This embodiment makes it possible to obtain better results than the preceding one (the estimated positions are more stable and more robust to the optical blur). It is also possible to use a smaller number of points of interest. Nonetheless, a drift can be observed. Also, it is more complex to implement owing to the assignment of parameters between recursive matches and KLT type matches.

Figure 5:
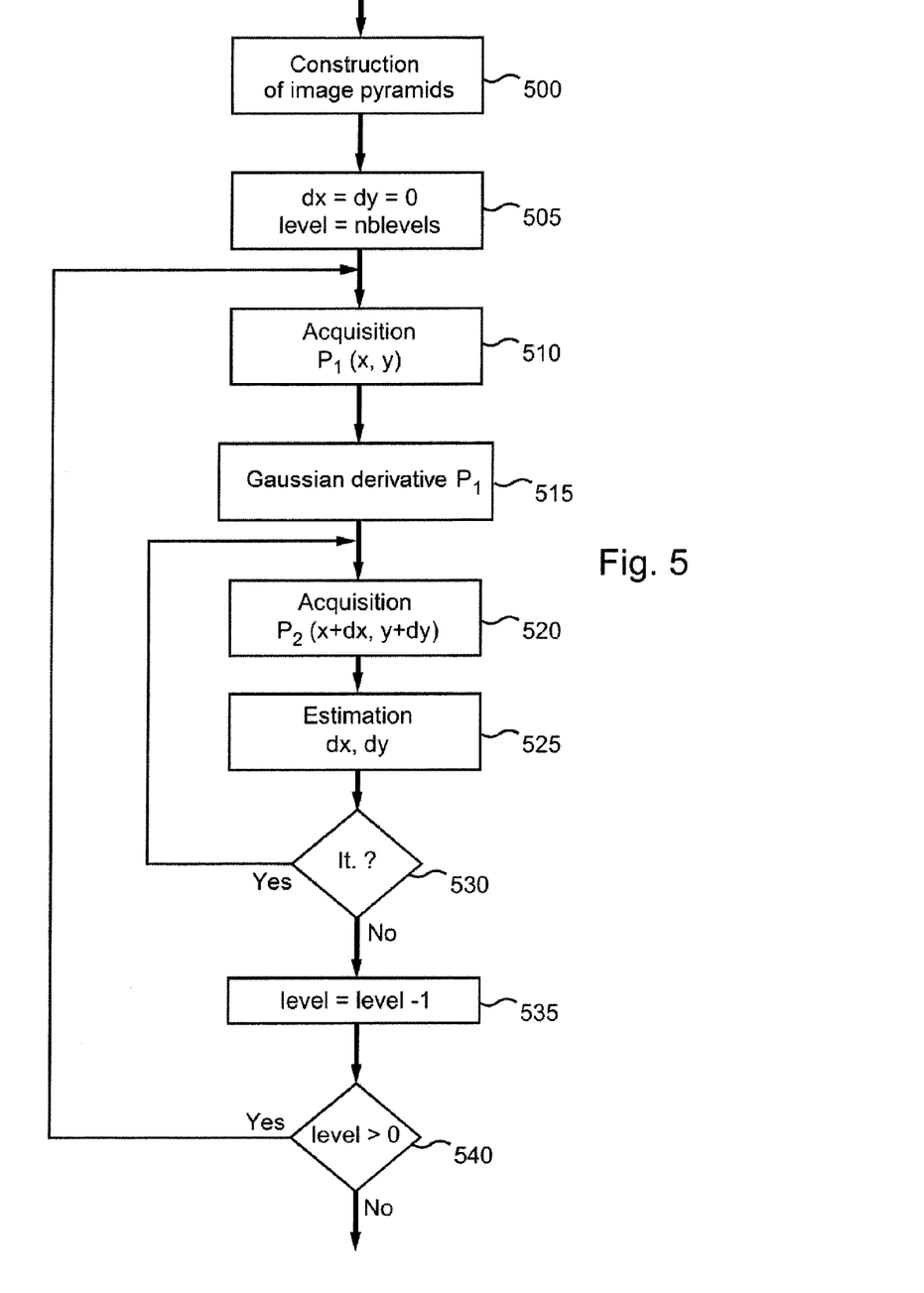
FIG. 5 illustrates an example of an algorithm of the KLT type implemented in the embodiment illustrated with reference to FIG. 4 to estimate the affine transformation between elements of a preceding image and a current image.

FIG. 5 diagrammatically illustrates an example of an algorithm of the KLT type implemented in this embodiment in order to estimate the affine transformation between the elements of a preceding image and a current image. The KLT algorithm is modified here to allow it to be implemented on a lightweight platform such as a mobile telephone.

The purpose of a first step (step 500) is to construct a first pyramid of images for the current image and a second for the preceding image. Each of these pyramids here includes five levels, the lowest level corresponding to the image taken from the image sensor.

Advantageously, the images are smoothed with a Gaussian filter with a 5×5 kernel before being sub-sampled (their respective dimensions are for example divided by two). The coefficients of the smoothing kernel are preferably integers, ideally powers of two, so as to reduce the number of elementary operations carried out. Also, sub-sampling is carried out here without bilinear interpolation, this not being necessary owing to the smoothing.

Variables dx and dy representing the movement of an image portion under consideration between the preceding image and the current image are initialised at zero (step 505). Similarly, the level variable, representing the current level of the pyramid is initialised at the highest value (called nblevels), here five. It is observed here that variables dx and dy make it possible to define sub-pixel coordinates, i.e. with a resolution less than the size of a pixel. However, in order to simplify the calculations, they are carried out to the nearest scale factor so as only to process the integers.

Image portion $P_1$ centred on the point of interest being processed, with (x, y) as coordinates, is then retrieved from the preceding image at level level of the pyramid (step 510). Such an image portion typically has a size of 5×5 or 7×7 pixels.

The Gaussian derivative of this image portion is then determined (step 515). This calculation is preferably carried out to the nearest scale factor in order only to work with integers.

Image portion $P_2$ centred on the point with (x+dx, y+dy) as coordinates is then retrieved from the current image at level level of the pyramid (step 520).

The values of variables dx and dy are then estimated (step 525), here according to the Gauss-Newton algorithm. This step makes it possible to estimate variables dx and dy which minimise the difference between a portion of the preceding image and a portion of the current image. This estimation is iterated several times to allow convergence towards a local minimum leading to a global minimum thanks to the use of different levels of image scale. Again, the use of integers for these calculations makes a significant gain in performance possible.

A test is then carried out (step 530) to determine whether the predetermined number of iterations of this algorithm has been reached or not and whether variables dx and dy are in a predetermined range. If not, the preceding steps (steps 520 and 525) are repeated. Otherwise, the level variable is incremented by one (step 535) and a test is carried out (step 540) to determine whether all the levels of the pyramids have been processed. Steps 510 to 540 are repeated until variables dx and dy have been evaluated on the images with the greatest resolution.

Advantageously, only a few points of interest are processed at low resolution scale levels (i.e. at the upper levels) of the image pyramids. Thus, only the central point of the object to be tracked is preferably processed in the highest level (for example 40×30) and four points uniformly distributed on this object are processed in the directly lower level (for example 80×60). These upper scale levels make it possible approximately to estimate large movements between two images. The lower scale levels are processed here in a standard manner. The estimated translation (dx, dy) in a lower scale level is applied here at the directly lower level. These lower levels make it possible to refine the position of the points found.

Figure 6:
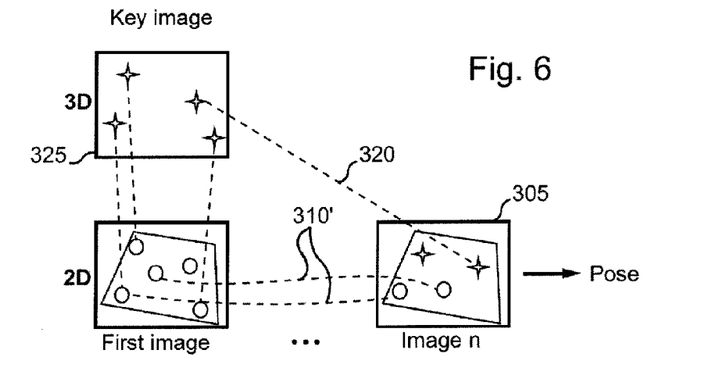
FIG. 6 diagrammatically illustrates a third implementation of the steady state of the hybrid algorithm for tracking the representation of objects in a sequence of images represented in FIG. 1.

According to a third embodiment, the correlation step described with reference to FIG. 3 (step 310) is replaced by a step to track points of interest of the KLT type as described with reference to FIG. 4 (step 310'). In other words, tracking points of interest between the preceding image and the current image is only carried out using an algorithm of the KLT type.

FIG. 6 diagrammatically illustrates the implementation of this tracking algorithm.

This embodiment makes it possible to obtain good stability of the estimated poses, which are also robust to the optical blur. It is also possible to use a smaller number of points of interest. However, significant drift may be observed.

Figure 7:
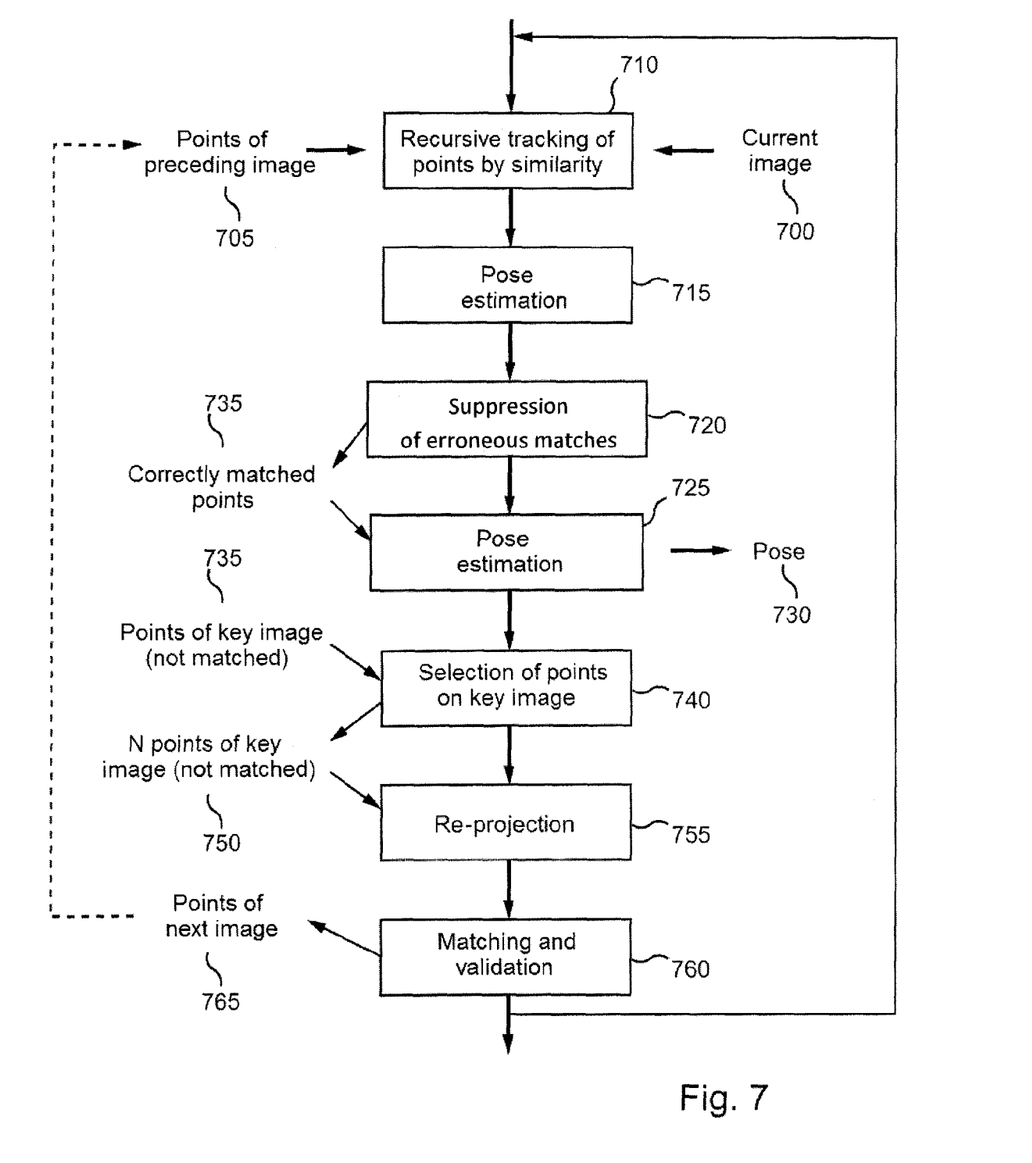
FIG. 7 diagrammatically illustrates certain steps in an example of an object tracking algorithm according to a fourth embodiment for the implementation of the steady state of the hybrid algorithm for tracking the representation of objects in a sequence of images represented in FIG. 1.

According to a fourth embodiment, the tracking method only implements a KLT type algorithm without requiring the detection of any point of interest in the current image. This embodiment, stable and robust, can be implemented in real time on a lightweight platform such as a mobile telephone using the modified KLT algorithm described above.

FIG. 7 diagrammatically illustrates certain steps of the object tracking algorithm according to this fourth embodiment.

As illustrated, points determined previously are tracked recursively by seeking similar image portions in the preceding and current images. A pose is then estimated thanks to these 2D/3D correspondences (the 3D coordinates are given by the position of the points of interest in the key image, given that the points tracked recursively retain an initial reference on points of interest of the key image). New points of interest are then selected in the key image and the corresponding points are sought in the current image to allow processing of the next image.

More precisely, a first step consists of tracking in the current image 700 the points 705 identified in the preceding image or the points matched with the key image after the initialization phase (step 710). This tracking of points is carried out here using the modified KLT operator described above. It makes it possible to obtain, for each of the points thus identified in the preceding image, a corresponding point in the current image.

The points thus tracked make it possible to obtain a series of 2D/3D correspondences (2D position of the points in the current image and 3D position in the key image). As indicated above, these correspondences are here estimated with sub-pixel precision.

This set of correspondences is then used in a pose estimation method (steps 715, 720 and 725) which makes it possible to evaluate a state vector with six degrees of freedom (three degrees of position and three degrees of orientation) characterising the movement of the tracked object between the preceding image and the current image.

For this purpose, the object of a step is to estimate a first pose (step 715) which can be used to suppress erroneous matches taken from the tracking of points (step 720). The pose is estimated here in a standard way according to the matching of points of the preceding and current images.

In order to suppress erroneous matches originating from point tracking, a maximum authorised re-projection threshold is used (for example a Euclidian distance of 4 pixels) in order to verify that the points identified in the preceding image and re-projected according to the pose evaluated conform with that pose. For this purpose, the 3D coordinates of each point identified in the preceding image are projected using the pose estimated previously. The re-projection error is give by the Euclidian distance between the re-projected 2D coordinates and the tracked 2D coordinates of the tracked point.

The pose 730 of the tracked object in the current image is then evaluated (step 725) using only the correctly matched points 735.

Optionally, it is possible to associate a weighting with each of the correspondences considered correct using an error weighting function based on the distance between the tracked points and the re-projected points. Such error weighting is typically calculated as a function of the estimated median with all of the re-projection errors squared (or residual) and the re-projection error squared for the current sample. It is thus possible to improve the pose of the tracked object on the basis of correctly matched points as a function of the weighting. This directly affects the calculations for each of the iterations of the Gauss-Newton algorithm. During this step, the maximum authorised re-projection threshold is reduced (for example to a Euclidian distance of 2 or 1 pixel(s)) in order to eliminate points which would tend to drift with the KLT tracking algorithm.

After estimating the pose of the tracked object, the points 765 to be used to track the object in the next image are determined. Advantageously, these points group together points originating from the preceding image correctly matched in the current image (i.e. points validated during the re-projection step) and points of interest of the key image. In other words, the points used in the next image are a combination of points tracked correctly in the current image from the preceding image and new points obtained using the key image. This combination of points makes it possible to avoid drifts in/of the object tracking method.

The points of interest 750 of the key image to be used are determined (step 740) from points of interest 745 of the key image by re-projection in the current image. Several types of selection of points of interest of the key image can be implemented:

use of all the active points of interest of the key image (i.e. with no correspondent in the preceding image). This is the most costly solution since many points are potentially available in the key image. Furthermore, when these points of interest are constructed on different key images, they are constructed at different scale levels in order to improve the initialization phase, which further increases the number of points of interest available on the key image;

selection of points of interest as a function of the size of the tracked object in the current image. Since the size of the object in the current image is known (surface area in pixels in the current image), it is possible to select points of interest according to the most relevant scale. For example, when the object is close to the camera and the current image processed by the method is 320×240 pixels, it may be advisable to select the points of interest corresponding to the scale level closest to this value (320×240). This selection makes it possible to identify points of interest able to be tracked robustly when the tracked object is approaching or moving away with respect to the camera. However, many points of interest can be selected in this way, which may entail a significant amount of calculation;

selection of points of interest according to a grid combined with the key image. A grid of size N×M is constructed here on the key image in order to select the points of interest. It is thus possible to select one point of interest, preferably the most relevant, per cell of the grid visible on the current image. For example, 35 points of interest of the key image can be selected for a grid of size 7×5. When the object leaves the field of view of the camera, the point selection algorithm can select several points per cell of the grid in order to retain a constant number of tracked points. This grid has the double advantage of allowing the selection of points of interest uniformly distributed over the surface of the object (which makes it possible in particular to stabilise the final estimated pose) and avoiding the selection of points of interest close to one another (which may be considered of no use).

The image portions of the key image, situated around points of interest, are then retrieved and re-projected (step 755) according to the current pose information estimated previously. It is observed that the image portions re-projected are very similar to the current image with, in general, a significant variation in intensity. This re-projection is costly in terms of calculation since, for each pixel of the destination image, the sub-pixel coordinates have to be found in the source image as a function of the inverse homographic transformation which links the two images. Therefore, one pixel in the destination image portion corresponds to an interpolation of several pixels in the source image. In order to optimise the calculation, the interpolation can advantageously be replaced using the closest adjacent technique.

In a next step, a comparison is made between the portions of the key image re-projected and the corresponding portions of the current image so as only to validate the selected points of interest associated with the re-projected image portions similar to the corresponding portions of the current image (step 760). This validation step may include the following steps:

- matching of the image portions associated with the selected points of interest re-projected in the current image with respect to the current pose. The KLT tracking method is preferably robust to changes in illumination since the colorimetric differences between the key image and the current image may be significant and
- validation of the matches made using, for example, a ZNCC or SAD type operator (acronym for Sum of Absolute Differences). This step of validation by comparison of image portions is important in preventing any drifts associated with the KLT tracking operator used.

The points of interest thus selected and validated are added to the set 765 of recursive points to be used to track the object in the next image.

Figure 8:
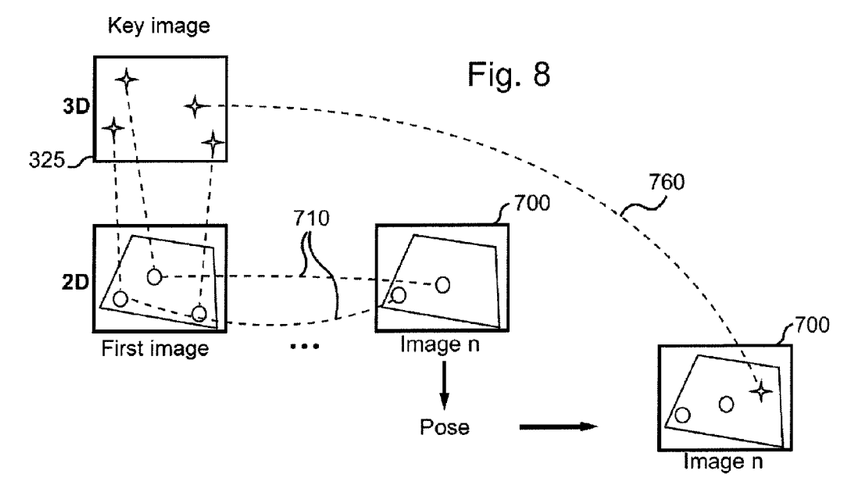
FIG. 8 diagrammatically illustrates the implementation of the tracking algorithm represented in FIG. 7.

FIG. 8 diagrammatically illustrates the implementation of this tracking algorithm.

Figure 9:
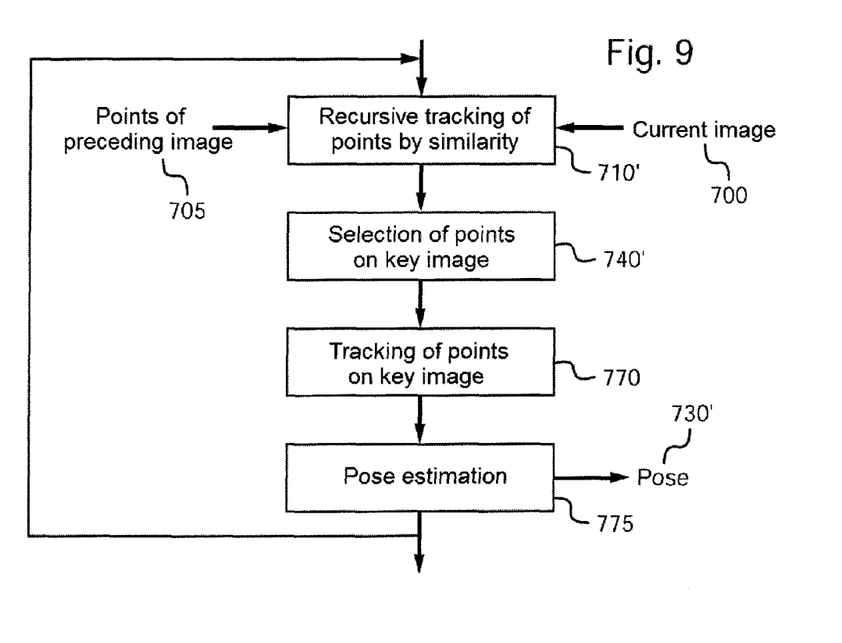
FIG. 9 diagrammatically illustrates certain steps in a variant of the example of an object tracking algorithm according to the fourth embodiment for the implementation of the usage phase of the hybrid algorithm for tracking the representation of objects in a sequence of images represented in FIG. 1.

Alternatively, the pose of the tracked object in the current image can be estimated after selecting and validating the points to be used to track the object in the next image in order to avoid drifts which might appear on certain types of objects. This may in particular be observed when the object has distinct outlines, for example black edges, since the points of interest used by the KLT tracking method may tend to track these outlines and give poor 2D/3D correspondences (called outliers).

FIG. 9 diagrammatically illustrates certain steps of such a variant of the object tracking algorithm according to the fourth embodiment.

As before, the purpose of a first step (step 710') is to track in the current image 700 the points 705 identified in the preceding image or the points matched with the key image after the initialization phase. Again, this tracking of points is here carried out using the modified KLT operator described above. It makes it possible to obtain, for each of the points thus identified in the preceding image, a corresponding point in the next image.

The purpose of a next step (step 740') is to select points of interest in the key image. This step is similar to step 740. However, since the points of interest selected are used to estimate the pose of the tracked object in the current image, they cannot be re-projected with respect to this pose but, possibly, with respect to the pose determined according to the preceding image.

In order to improve and simplify the tracking of recursive points (step 710') and points of the key image (step 740'), a linear model for the prediction of poses may be advantageously used. Thus, using a history of preceding poses, it is possible to predict the position of the points of interest sought in the current image and thus avoid having to construct and run pyramids of significant images, the lowest levels of resolution no longer being required.

Image portions around the points of interest selected are retrieved and re-projected according to the pose of the tracked object in the preceding image in order to be compared with portions of the current image according to a tracking algorithm, here the KLT algorithm, in order to match these points of interest with corresponding points of the current image (step 770). Since, with regard to the matches between points of the preceding image and points of the current image making it possible to determine the affine transformation between these points of the preceding image and the corresponding points of the current image, these matches between points of the key image and corresponding points of the current image make it possible to determine the affine transformation between the selected points of interest of the key image and the corresponding points of the current image.

The matches between points of the preceding image and the corresponding points of the current image and between points of the key image and the corresponding points of the current image make it possible to determine the pose 730' of the tracked object in a standard way (step 775).

The method described here, implemented according to one of the embodiments set out above, is particularly suitable for tracking non-planar objects, in particular in a system with limited processing resources such as a mobile telephone. It can thus be used, for example, to track faces in a sequence of images.

Figure 10:
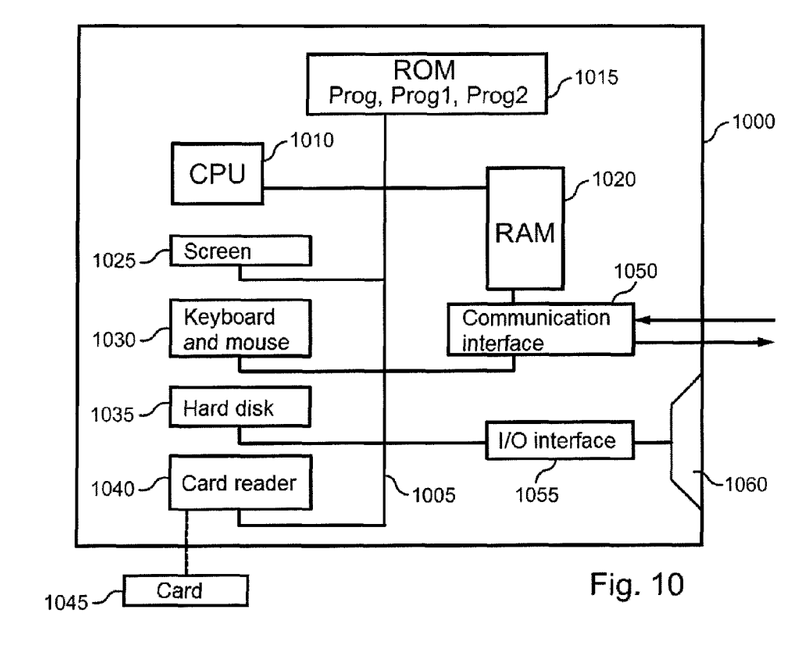
FIG. 10 illustrates an example of hardware architecture suitable for implementing the invention.

FIG. 10 illustrates an example of hardware architecture suitable for implementing the invention, in particular the algorithms described with reference to FIGS. 1, 2, 3a, 5, 7 and 9. Such a device is, for example, a mobile telephone, a personal assistant or a portable personal computer or netbook type. The device 1000 includes here a communication bus 1005 connecting:

- a central processing unit or microprocessor 1010 (CPU);
- a read-only memory 1015 (ROM) capable of holding the programs needed to implement the invention;
- a random-access memory or cache memory 1020 (RAM) holding registers suitable for recording the variables and parameters created and modified during the execution of the above mentioned programs; and
- a communication interface 1050 suitable for transmitting and receiving data.

The device 1000 also preferably has the following elements:

- a screen 1025 making it possible in particular to display a real scene as observed by an image sensor (1060) connected to the bus 1005 via an input/output interface (1055), preferably augmented by virtual objects, and able to act as a graphic interface with the user, who is able to interact with the programs according to the invention using a keyboard and a mouse 1030 or another pointing device such as a touch screen or a remote control;
- a hard disk 1035 able to store the above mentioned programs and data processed or to be processed according to the invention, for example correction tables; and
- a memory card reader 1040 capable of accepting a memory card 1045 and reading or writing data processed or to be processed according to the invention.

The communication bus provides for communication and interoperability between the different elements included in the device 1000 or connected to it. The representation of the bus is not limitative and, in particular, the central processing unit is capable of communicating instructions to any element of the device 1000 directly or through another element of the device 1000.

The machine code for each program enabling the programmable device to implement the process according to the invention, can be stored, for example, on the hard disk 1035 or in read-only memory 1015.

According to a variant, the memory card 1045 can contain data, in particular a look-up table between the events detected and the commands called for, and also the machine code for the above mentioned programs, which, once read by the device 1000, is stored on the hard disk 1035.

According to another variant, the machine code for the programs is able to be received, at least partially, through the interface 1050 to be stored in a manner identical to that described above.

More generally, the program(s) can be loaded into one of the storage means of the device 1000 before being executed.

The central processing unit 1010 commands and directs the execution of the instructions or portions of software code of the program(s) according to the invention, instructions which are stored on the hard disk 1035 or in the read-only memory 1015 or in the other above mentioned storage elements. When powering up, the program(s) stored in non-volatile memory, for example the hard disk 1035 or the read-only memory 1015, are transferred to the random-access memory 1020 which then contains the machine code for the program(s).

Naturally, in order to meet specific needs, a person skilled in the art of the field of the invention will be able to apply modifications to the above description.

The invention claimed is:

1. A method of hybrid tracking a representation of at least one object in a sequence of images using at least one key image, the method being implemented on a computer, and comprising the following steps:
   acquisition of a first and second images of said sequence of images including a representation of said at least one object;
   identification of at least one first image portion of said first image, said at least one first image portion of said first image including at least one part of a representation of said at least one object;
   retrieval of at least one second image portion from said at least one key image, said at least one second image portion of said key image including at least one part of a representation of said at least one object;
   estimation of a relative pose of at least one first image portion of said second image, similar to said at least one first image portion of said first image, according to said at least one first image portion of said first image;
   search for at least one second image portion of said second image, similar to said at least one second image portion of said key image, the step of searching including a step of re-projecting the at least one second image portion of said key image according to an estimated pose of the at least one object, and
   estimation of a relative pose of said at least one object according to the relative poses of said first image portions and said second image portions.

2. The method according to claim 1 whereby said step of identifying said at least one first image portion of said first image includes a step retrieving (510) said at least one first image portion of said first image and whereby said step of estimating said relative pose of said at least one first image portion of said second image includes a step of searching (310, 710, 710'), in said second image, for said at least one first image portion of said second image, similar to said at least one first image portion of said first image.

3. The method according to claim 2 wherein said step of searching for said at least one first image portion of said second image similar to said at least one first image portion of said first image implements a search algorithm of the KLT type.

4. The method according claim 1 wherein said at least one second image portion is retrieved from said at least one key image according to at least one predetermined point of interest of said key image.

5. The method according to claim 4 also including a step of selecting (740, 740') said at least one point of interest.

6. The method according to the claim 5 also including a step of validating (760) said at least one selected point of interest.

7. The method according to claim 1 wherein said step of searching for at least one second image portion of said first or second image, similar to said at least one second image portion of said key image, implements an algorithm of the KLT type.

8. The method according to claim 1 in which said step of estimating a relative pose of at least one first image portion of said second image and/or said step of searching for at least one second image portion of said first or second image include a step of predicting a pose using at least one result of the relative pose estimation of said at least one object carried out on preceding images.

9. A non-transitory computer readable storage medium comprising a computer program, said computer program including instructions suitable for the implementation of each of the steps of the method according to claim 1 when said program is executed on a computer.

10. A device including means suitable for the implementation of each of the steps of the method according claim 1.

11. The method according to claim 1 further comprising an initialization step, the initialization step comprising a step of recognizing the at least one object.

12. The method according to claim 11 wherein the initialization step comprises a step of evaluating the pose of the at least one object.

13. The method according to claim 11 wherein the initialization step is carried out when the at least one object is lost.

\* \* \* \* \*